Oct. 24, 1967   M. I. COHN ET AL   3,348,778
REDUCING PARTICLE SIZE OF CLAY AND RHEOLOGY
CONTROL OF CLAY-WATER SYSTEMS
Filed March 4, 1966   2 Sheets-Sheet 1

INVENTORS
MORRIS I. COHN
ROY D. PERDUE
BY Dike, Thompson, Bronstein & Mrose
ATTORNEYS United States Patent Office 3,348,778
Patented Oct. 24, 1967

3,348,778
REDUCING PARTICLE SIZE OF CLAY AND RHEOLOGY CONTROL OF CLAY-WATER SYSTEMS
Morris I. Cohn, Needham, and Roy D. Perdue, Andover, Mass., assignors to Mineral Industries Corporation of America, Needham, Mass., a corporation of Massachusetts
Filed Mar. 4, 1966, Ser. No. 540,126
20 Claims. (Cl. 241—5)

ABSTRACT OF THE DISCLOSURE

A method for decreasing the particle size, and increasing the dilatancy point, of clay by flowing a liquid clay slurry of substantially less than 30% by weight clay in the form of a thin film edgewise through a thin gap under high pressure and velocity.

This application is a continuation-in-part of each of our copending U.S. patent application Ser. No. 329,586, filed Dec. 10, 1963, allowed Sept. 24, 1965, and copending application Ser. No. 294,637, filed July 12, 1963, both now abandoned.

This invention relates to clay and methods of treating the same. More specifically it relates to the grinding of kaolin so as to make it more useful in the manufacture of paper, and to rheology control of clay-water systems.

Clay is used in the manufacture of paper in order to develop from the basic cellulosic structure a product of wider utility. The clay can be incorporated either in the cellulosic fibers, in which case it is called a filler grade, or the clay can be laid upon the surface of the paper as a thin film, in which case it is called a coating grade. Wider utility of the finished paper arises from the fact that the paper thus formed will have greater opacity, smoothness, brightness and gloss; better receptivity to inks and other surface treatments; and improved color and other desirable properties.

The clay most widely used is kaolin in which the predominant mineral is kaolinite. As a coating grade, it is seldom applied alone, but in conjunction with binders, adhesives and/or other minerals or pigments to achieve a calculated effect or group of properties.

Whatever the source of the kaolin bearing ore, the kaolin products derived therefrom must meet the requirements of low abrasion, fine particle size, and other specifications set by the industry for the various grades of filler and coating kaolin. With respect to particle size, kaolin for paper filling applications must be approximately 30% finer than 2 microns E.S.D. (equvalent spherical diameter). Kaolins for paper coating applications must be at least 70% finer than 2 microns and present trends are toward exceedingly fine kaolins which are higher than 90% in material that is finer than 2 microns. These exceedingly fine kaolins command a premium selling price, and indeed, it is always the case that, all other properties being approximately equal, the finer the kaolin, the higher the selling price.

As sources of kaolin which have the proper size distribution for paper and other applications become exhausted, the problem of grinding kaolin to achieve optimum particle size for paper has received more and more attention. It would be exceedingly desirable to have a convenient and economical method of grinding coarse kaolins which fulfill all specifications for paper applications except those involving particle size. Furthermore, it would be desirable to have such a method of grinding which could be used to reduce the particle size of filler kaolins so as to permit the resulting ground products to meet standard coating kaolin particle size requirements. The development of such a method has been made the subject of many patents by established kaolin producers who are further motivated by the relative imbalance of demand for coating and filler grades wherein the latter are frequently discarded even after expensive water washing operations in order to secure adequate amounts of the former.

Accordingly, it is an object of this invention to provide a method for reducing the particle size of kaolins, including those particles which already are small in size, e.g, 25 microns and less, but not small enough, to exceedingly small sizes, which method is economical, continuous, virtually instantaneous and easy to carry out It is another object of this invention to provide such a method for treating kaolins to convert them to products of commercial utility, especially meeting paper filler and coating requirements with respect to particle size.

It is another object of this invention to provide a method for treating paper filler kaolins to convert them to paper coating clays which will meet paper coating kaolin particle size requirements.

It is another object of this invention to provide a method for treating paper filler and coating kaolins to convert them to kaolins which will meet the particle size requirements of the very finest paper coating kaolins available.

Coating grades are more costly than filler grades. As aforesaid, they are finer in particle size and brighter. Moreover, their method of application to the paper, i.e., in coating mixtures as a thin film on the surface, requires that they lend themselves to the highly specialized coating techniques which have been developed for making such application.

Generally, the paper coating composition containing the coating clay and other ingredients is spread on the paper as it moves rapidly and continuously through the process. The tendency in the industry is towards higher and higher speeds of paper within the paper forming or making machine, and consequently the speed at which the to-be-coated paper can pass through the coating process is of critical importance.

A detailed description of the several coating methods for applying clay-based coating compositions to rapidly moving paper is not necessary for understanding the inventions hereinafter claimed. One such method involves passing the paper between a pair of pressure rolls, the paper-entering nip of which contains the coating mixture.

The coating composition itself is made of clay, adhesives, and other ingredients suspended in water. The composition must be of sufficiently high solids content so that the coating method employed can impart a sufficient quantity of coating per unit area to the rapidly moving paper. Furthermore, especially at the higher operating speeds, there is also a need for higher solids in coating compositions in order to facilitate drying the coated sheet. Coatings applied at 67% solids by weight (approximately 2 parts solids to 1 part water) require as little as 25% of the drying capacity needed when a coating with a composition containing 33% solids by weight (approximately 1 part solids to 2 parts water) is used. Moreover, at these higher solids concentrations, the coating composition must have the proper flow characteristics (rheology) under the dynamic conditions of the coating process.

The term "rheology" is applied to the phenomena which occur during the deformation and flow of matter. See Rheology of Paper Coatings by R. A. Diehm, published 1961 by Fritz Publications Inc., Chicago, Ill. In clay coating compositions, the rheological behavior is just as important as the properties that the coating composition imparts to the finished paper, since without proper flow and consistency during the coating process, the coating process becomes inoperative. To understand the objectives of the invention set forth below, it is necessary to define two more terms used in discussing the rheological behavior of coating clays and compositions: thixotropy and dilatancy.

When a clay-water slurry or coating composition is stirred or agitated, shear forces are developed in the system by virtue of the movement of the agitator. Some clay-water systems become less viscous and of a thinner consistency during such agitation as compared to quiescent or near quiescent conditions. When the agitation or shearing ceases, the viscosity and consistency almost immediately return to their former higher values. Such transformations by shearing forces are called thixotropy and systems having this property are called thixotropic.

Other clay-water slurries or coating compositions do not respond to shear forces in the same way. In fact, the response is just the opposite. When shear or agitation is applied, the system becomes more viscous and has a higher consistency as compared to quiescent or near quiescent conditions. When the agitation or shearing ceases, the viscosity and consistency almost immediately return to their former lower values. Such transformations by shearing forces are called dilatancy and systems having such property are called dilatant.

Clay-water systems which are neither thixotropic nor dilatant may be termed plastic. The viscosity of these plastic systems increases with increase in clay concentration but shows little difference under dynamic (shearing forces) and near quiescent conditions.

It is highly desirable and in many cases essential that clay coating compositions be thixotropic rather than dilatant or plastic. The high shear forces developed by every high speed paper coating method make it highly desirable that the clay actually aid in imparting thixotropy to the coating composition so that the composition will have maximum liquidity as it is applied so that a smooth level coating will be produced.

If a coating composition is not thixotropic and is dilatant, the shear forces developed in the coating process may cause the composition to become too viscous for proper application to the paper, and in some cases to lose its liquidity completely, temporarily taking on a pseudo-dryness which will prevent the coating composition from being transferred to the moving paper altogether.

At dilute concentrations, the increase in viscosity under dynamic conditions even of dilatant systems may not be sufficient to prohibit the use thereof in paper coating but such concentrations are too dilute for many paper coating processes.

In clay-water systems, the rheological phenomena of thixotropy and dilatancy become more pronounced as the concentration of clay increases. Because higher paper speeds require greater solids concentration in coating compositions, the rheological behavior of these compositions and the clay in them is a major consideration.

Furthermore, in preparing both filler and coating grades for shipment to the paper mill, clay suppliers formerly supplied these commodities only in dry form. However, since the best grades of clay result from certain water washing and particle size fractionating steps, there is an increasing trend toward partially eliminating the final drying step, preferably concentrating and shipping the clay as a 70% or higher percent solids-by-weight slurry. The higher freight rates pair per ton of dry clay shipped in this form are offset by the partial elimination of the drying cost, the elimination of much of the contamination and discoloration of the clay during the drying step, the ease in handling the clay in this form, and the more compact storage achieved in tanks rather than silos designed for dry solids.

These highly concentrated clay slurries must be pumpable and readily flowable if they are to be transferred and handled easily. Dilatant slurries present pumping problems, and it is apparent that not only in the end use in paper but in the shipment of clay slurries, rheological behavior is of major importance.

Most clay-water mixtures which are thixotropic ultimately become dilatant when the concentration of clay is increased. The dilatancy point is that concentration by weight of clay in a clay-water mixture at which agitating or shearing or other dynamic handling of the mixture causes marked dilatancy to be exhibited. The dilatancy point is determined by gradually adding measured amounts of dry clay to a measured amount of water containing a small amount of dispersing or deflocculating agent, e.g. 1% by weight of the water, with stirring until the slurry loses its liquidity and exhibits a pseudo-dryness and putty-like consistency during stirring with a resulting sharp rise in resistance to stirring. The concentration of the clay at this point is called the dilatancy point and the slurry in this condition is termed dilatant.

It has been stated above that thixotropy at high concentrations of clay-water systems is desirable in order that the system will flow under high shear. Broadly speaking, it is highly desirable, aside from thixotropy and dilatancy, to be able to increase the concentration of any clay in a system containing clay and water at which concentration such system will remain sufficiently fluid to lend itself to use in the paper coating processes.

Accordingly, it is another object of the present invention to increase the concentration of clay which can be used in systems containing clay and water while still maintaining fluidity of the system.

It is another object of the invention to increase the concentration of clay in systems containing clay and water, at which concentration such systems remain sufficiently fluid to lend themselves to use in continuous paper coating processes.

It is another object of the invention to increase the concentration of clay in systems containing clay and water, at which concentration such systems remain sufficiently fluid to be readily handled by pumps and other mechanical devices.

It is another object of this invention to provide a method of increasing the permissible concentration of clay in water so that the concentration at which it becomes dilatant is substantially increased, that is, the dilatancy point is substantially increased.

It is another object of this invention to provide a method of treating clay, such as kaolin, so that the concentration by weight at which it can be employed in a paper coating composition is substantially increeased.

It is yet a further object of this invention to provide a method of treating clay, such as kaolin, so that the concentration by weight at which a slurry of said kaolin remains pumpable and flowable by other mechanical means is substantially increased.

It is another object to provide novel compositions of matter comprising clay and water having a substantially higher clay concentration than has been heretofore achievable with such clay without undue increase in viscosity.

It is yet another object to provide novel compositions of matter comprising clay and water having a dilatancy point higher than has heretofore been achievable with such clay.

It is yet another object to reduce the viscosity of clay-water systems of any given clay concentration.

It is yet another object to increase the dilatancy point of clay and to provide clay having such dilatancy point.

It is another object of the invention to increase the concentration of clay which can be employed in a paper coating composition and to provide such a paper coating composition of increased clay concentration.

The above mentioned objects are achieved in accordance with the present invention by applying a high fluid pressure on a liquid slurry or pulp of the clay particles having a clay solids concentration substantially greater than 25%, preferably not substantially less than 30% by weight, and more preferably 40% or 50% by weight or more, to force the slurry to flow in the form of a thin edgewise and at a high velocity by virtue of reduction of such high pressure to a lower pressure through a highly restricted opening or gap formed by closely spaced hard surfaces to thereby impart shearing, turbulence, shattering, impact and cavitation forces on the clay particles. The highly restricted opening or gap is in the nature of a fraction of an inch.

Preferably the clay slurry is discharged from the opening at a high velocity against a hard impact surface directly in front of the opening. Discharge against the hard impact surface provides optimum treatment of the clay particles, but it is not essential.

When clay is thus treated, the size of the clay particles, including particles 25 microns and less in size, is reduced by the aforesaid forces to thereby significantly increase the amount of minus 2 micron particles.

Furthermore, there is a marked thinning or decrease in viscosity of the clay slurry and an increase in the concentration at which the clay becomes dilatant. The reasons why this occurs are not completely understood.

It has been found that to achieve significant results with respect to reducing viscosity and increasing the concentration at which the clay becomes dilatant, the slurry feed through the gap should contain a deflocculating or dispersing agent or agents, such as an alkali metal salt of a phosphate e.g. tetrasodium pyrophosphate. The presence of the deflocculating agent is also helpful in achieving maximum efficiency in reducing particle size, as will be explained more fully hereinafter.

As aforesaid, the clay solids concentration of the slurry should be substantially greater than 25%, preferably not substantially less than about 30% or 40% by weight of the slurry and more preferably should be 50% or higher. It has been found surprisingly enough that grinding efficiency increases rapidly with concentration increases above 25% until a concentration of 50% is reached after which no further substantial increase in efficiency occurs. The concentration should not be so high as to interfere with the flowability of the slurry to and through the gap. It has also been found that the higher the clay solids concentration, the greater the decrease in viscosity and the greater the increase of the dilatancy point of the clay achieved by the treatment, so that for optimum results the concentration should be as high as can be processed through the opening or gap, i.e. the concentration of the feed to the gap cannot be increased to the point where the slurry is too thick or viscous to be processed through the gap.

The presence of the deflocculating agent in the slurry feed through the opening or gap increases the fluidity of the slurry and permits the maximum concentration of the clay in the feed to be increased substantially. Without the deflocculating agent it is difficult to achieve clay concentrations much greater than 30–45%, which are not too viscous for processing in accordance with the invention. However, with deflocculating agents the concentration may be increased as high as 50 to 65% and higher, which greatly enhances the effect of the processing on increasing the dilatancy point and decreasing the viscosity and which increases grinding efficiency as aforesaid.

The presence of a deflocculating agent is not nearly as important to the grinding phenomenon as it is for rheology control, i.e. increasing the dilatancy point.

Ranges of a concentration by weight of from 10% to 60% have been used to study the grinding effect, with special effects being noted above 30%.

Since the processing step itself lowers viscosity, more clay can be added after the processing step to further increase the solids concentration without rendering the slurry too viscous for further processing. Thereafter, the resulting, more concentrated slurry is subjected to further processing which again lowers the viscosity and still further increases the dilatancy point as compared to such further processing without the addition of more clay as above mentioned. In this way, the dilatancy point and fluidity of clays can be increased substantially.

However, from the point of view of grinding efficiency alone, there is no particular advantage in adding more clay after the first processing to increase the clay concentration followed by further processing unless this is necessary to raise the clay concentration to 50%.

In a preferred embodiment, the restricted opening or gap comprises a valve opening and the clay slurry under high pressure is directed against the valve to force it slightly away from its seat against the force of resilient means, such as a spring or the like, yieldingly urging it toward its seat, whereby the clay slurry under pressure is forced in the form of a thin film edgewise at an extremely high velocity through the highly restricted opening between the valve and its seat and against the impact surface. The direction of flow of the clay slurry through the valve opening is at an angle to the direction of flow to the valve, and the opening is preferably annular in shape, i.e., it has the shape of a thin, annular disc.

Preferably, the valve is rotated to prevent the clay slurry from wearing a channel in the valve seat and to cause the wear effects of the slurry on the valve and valve seat to be more uniform, whereby the useful life of the valve and valve seat before overhaul and repair become necessary is substantially increased.

The fluid pressure can be generated by a suitable pressure pump, such as a piston pump operating on the slurry.

The valve, mounted on or near the pump discharge, can be any one of several designs such as that used for the high pressure homogenizing of milk and is commonly referred to as a homogenizing valve.

The impact surface can be provided by an impact ring around the annular valve opening and within a fraction of an inch therefrom, as is customary with valves of this design. The ring forms with the periphery of the valve and valve seat a passage of restricted cross-section extending at an angle to the valve opening and through which the clay slurry flows after impacting against the ring.

A pump and valve assembly such as that known as a Manton-Gaulin Single Stage Homogenizing Valve Assembly is suitable. Such assemblies have been known for many years, but to our knowledge they have never been used to accomplish the objectives of this invention. U.S. Patent No. 1,934,637 to Rafton describes the use of this kind of apparatus (no impact step is referred to) for reducing oversize mineral particles whose size is greater than .001 inch, i.e. 25 microns, including among other minerals clay broadly, but because Rafton's solids concentrations were 25% and less no significant amounts of particles 2 microns or less in size were produced and no significant amounts of small particles greater than 2 microns but less than 25 microns were reduced in size for the reasons to be set forth in greater detail below. Also Rafton does not disclose the rheology phenomena achieved by the present invention.

The apparatus described in our co-pending U.S. application Ser. No. 316,187, now U.S. Patent No. 3,162,379, and in our U.S. Patent No. 3,039,703 are suitable for carrying out the method of the present invention. However, valves of similar and modified design providing like action can be used within the scope of this invention. A preferred pressure is 1500 p.s.i. but the pressure may range from 100 or 200 p.s.i. to 5000 or 6000 p.s.i. and more as described in the above application.

Further objects and advantages of the present invention will be apparent from the following description and accompanying drawings describing and showing for illustrative purposes only, an embodiment of an apparatus for practicing the method of the present invention.

Figure 1:
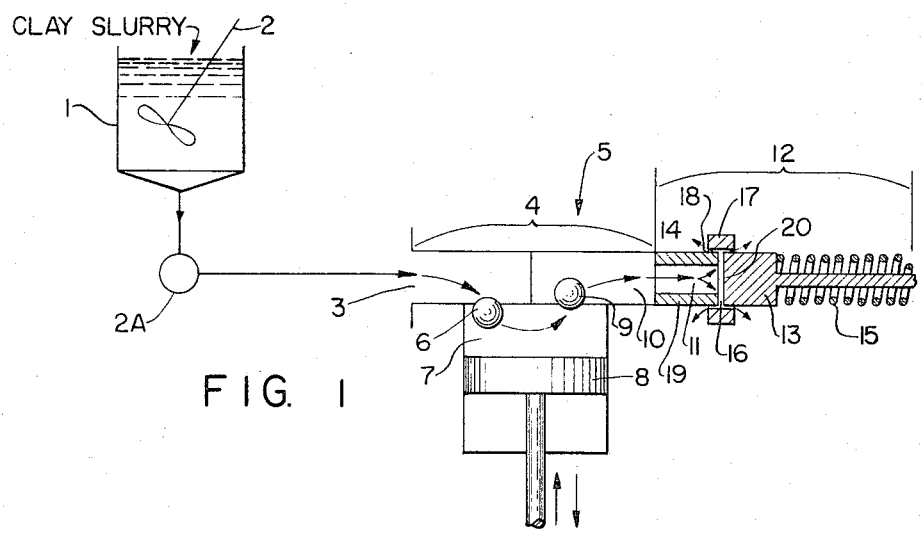
FIGURE 1 shows diagrammatically said embodiment of said apparatus.
Figure 2:
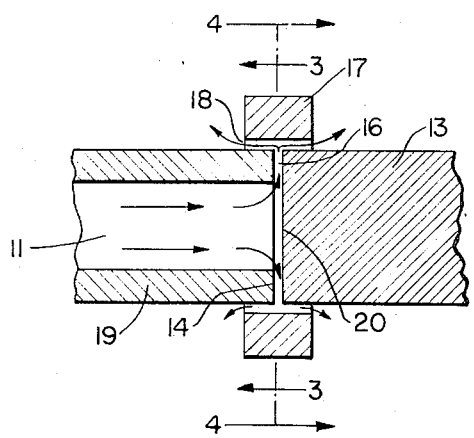
FIGURE 2 is an enlargement of a part of the homogenizing valve of the apparatus of FIGURE 1.
Figure 3:
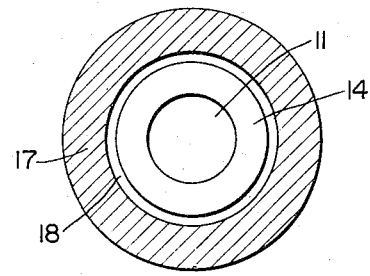
FIGURE 3 is a section taken along the line 3—3 of FIGURE 2.
Figure 4:
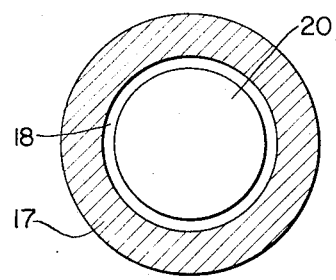
FIGURE 4 is a section taken along the line 4—4 of FIGURE 2.

Referring to these drawings, dry clay (kaolin) and water, are added, as hereinafter described, to feed tank 1 equipped with an agitator 2 to form a clay slurry. The agitator keeps the slurry solids in uniform suspension. One or more dispersing or deflocculating chemical reagents such as sodium silicate, tetrasodium pyrophosphate, etc., if not already present, may be added to the slurry in tank 1, although such reagents are not essential for practicing the invention insofar as the grinding phenomena is concerned. However, where the primary purpose is to increase the dilatancy point of the clay, it is more important that such dispersing reagents be present. They are important in the case of grinding only to the extent that they permit an increase in clay concentration up to about 50% at which concentration maximum grinding efficiency is achieved. However, with clays which permit a 35 or 40% clay concentration, grinding of substantial amounts of the smaller clay particles is achieved even without a dispersing agent albeit that by increasing the concentration to 50% by means of the dispersing agent more efficient grinding is achieved. The clay, water and dispersing agent may be added to tank 1 to form a slurry, as aforesaid, or, alternatively, if this invention is incorporated into a water washing process for clays, the clay may be pumped to tank 1 as a deflocculated and concentrated slurry of clay in water containing a deflocculating agent in which case an agitator may not be necessary. The clay slurry is fed by gravity or pump (not shown) to the inlet 3 of a liquid piston pump 4 of the pressure pump and valve assembly 5. The slurry is sucked from inlet 3 through suction ball check valve 6 of pump 4 into the pump cylinder 7 by the suction stroke of piston 8 and is forced through discharge ball check valve 9 to and through the high pressure pump 10 into the high pressure inlet passage or chamber 11 of the valve seat member 19 of valve assembly 12 and against valve 13 which is urged toward the valve seat 14 by a heavy spring 15. The high pressure exerted on the valve 13 by the slurry in the confined passage 11 forces the valve slightly away (a fraction of an inch) from its seat 14, whereby the slurry under pressure flows in the form of a thin film edgewise and at an extremely high velocity through the highly restricted valve opening or gap 16 against an annular impact ring 17 extending around the valve. The slurry then flows through the narrow passages 18 between the ring 17 and the adjacent outer peripheral walls of the valve 13 and valve seat member 19. Grinding and other mechanical working of the clay particles is achieved by the shearing effect on the clay particles of the closely spaced valve seat 14 and valve face 20 forming opening 16 and of the closely spaced impact ring 17 and outer peripheries of the valve and valve seat member forming passages 18, all of which are made of a very hard material such as tungsten carbide, by the turbulence and cavitation of the mineral particles as they flow through opening 16 against impact ring 17 and through passages 18, and by shattering and impact of the particles against the impact ring 17 and valve face 20. The various changes in direction of flow of the slurry from 11 to 16 (the direction of flow through the gap 16 is at an angle to the direction of flow in 11 to the gap) and from 16 to 18 also contribute to the grinding and other mechanical working of the clay particles.

The slurry leaves the valve assembly 12 and is discharged into another tank like 1 (not shown), whereupon it can be passed through another, or a plurality of, pump and valve assemblies (not shown) or passed through the same pump and valve assembly 5 once or more. Normally, several passes, e.g. 5 to 20 passes, through the pump and valve assembly are made, although considerable thinning or decrease in viscosity of the clay slurry and increase in dilatancy point result from even one pass.

When it is stated herein that the clay is subjected to a plurality of passes through the homogenizing valve or through the opening or gap thereof with or without the impact ring, this includes recycling the slurry through the same homogenizing valve or gap (with or without the impact ring) as well as passing it through a plurality of homogenizing valves or gaps in series with or without the impact ring.

Where the primary purpose is grinding, the slurry discharged from the pump and valve assembly 5 is preferably passed through a classifying device, such as a solid bowl centrifuge, hydrocyclone or other types of classifiers, or group of such classifying devices designed to yield a product of the desired particle size distribution and an oversize stream which can be recycled to the pump and valve assembly 5 via tank 1 for further grinding.

The equipment described in our U.S. Patent No. 3,039,703 is especially suited for practicing the present invention. However, as aforesaid, homogenizers such as that shown and described in our copending U.S. patent application Ser. No. 316,187 and homogenizers such as those made by Manton-Gaulin Manufacturing Co., Inc. of Everett, Mass., and others of similar design can also be used.

The width of the gap 16 is the same as that described in our copending application Ser. No. 316,187 and in our Patent No. 3,039,703 and used in conventional homogenizing valves, i.e. it is only a fraction of an inch, usually .001 to .005 inch, but under certain conditions it may be as large as 0.09 inch or even 0.1 inch.

The pressures used may be the same as those described in our above mentioned copending application and our above mentioned patent. Ordinarily, the pressure is at least 600 pounds per square inch, pressures between 1000 and 5000 pounds per square inch being preferred, but in certain cases some advantageous results may be achieved with pressures as low as 100 or 150 pounds per square inch.

The grinding effect

One encounters several problems in determining the effectiveness of any fine grinding means in producing particles of 2 micron size and smaller. Methods of measuring particle size in these lower ranges of fineness are inherently difficult. Techniques dependent on rate of sedimentation due to gravity or centrifugal force are now commonly accepted and used in the kaolin industry both for routine quality control and product specification. These methods employ sedimentation under gravity, or controlled centrifugal force, or a combination of both.

In the case of a batch grinder such as a sand filled attrition mill, the slurry together with its grinding media (sand) is retained for a sufficient period of time to achieve a significant increase in 2 micron and finer material. Through retention time of 30 minutes and longer, significant increases in minus 2 micron content can be effected.

In the case of the present invention, grinding is almost instantaneous, and hold-up within the apparatus is negligible. The production of new minus 2 micron material is relatively small per pass through the apparatus, but the high throughput for the apparatus of the present invention relative to its size more than compensates for the small yield per pass through it, and by increasing the number of passes the total production of new minus 2 micron material is substantial. Furthermore, lack of hold-up and continuous operation achievable in accordance with the present invention provides for convenient classificaiton of the discharge from the valve assembly 12, thereby avoiding overgrinding and increasing overall grinding efficiency. However, the present invention also contemplates batch grinding in the sense that the entire output from the valve is subjected a plurality of times to the same action in the same or different valves before classification. In some cases, classification may not be necessary after a sufficient number of passes.

An alternate method of measuring particle size which has been applied to clays employs an electronic device known as the Coulter Counter and is described in detail in ASTM Special Technical Publication No. 234 entitled "Electron Size Analysis of Subsieve Particles by Flowing Through a Small Liquid Resistor," by Robert H. Berg. This method can accurately count the number of particles coarser than a given size in a kaolin slurry sample and through suitable calculations these results can be converted to concentration by weight. From this the weight percent of particles finer than such given size can be computed. From a practical standpoint, the method cannot reliably count kaolin particles finer than about 0.5 micron. Nevertheless, analysis of a slurry taken over a given size range before and after grinding permits measurement of the effectiveness in producing new minus 2 micron material.

*Example 1*

This example illustrates the grinding effect achieved by passing a slurry of a residual or primary kaolin once through the pump and valve assembly. The kaolin was obtained from the Vermont Kaolin Corporation of Bristol, Vt. and at this stage of processing, contained approximately 70% by weight of kaolinite and 30% silica and other impurities, i.e. mica and feldspar. Referring to FIGURE 1, a 42% by weight slurry of kaolin in water was charged to tank 1. The slurry contained approximately 2 lbs. of sodium hexamataphosphate per ton of dry slurry solids. The slurry was fed by means of pump 2A to a pump and valve assembly 5. The pump and valve assembly operated at a rate of 4 gallons per minute and at a pressure of 1500 p.s.i. The valve assembly was that of our U.S. Patent No. 3,039,703, except that a rotating blade was not used, i.e., only the valve was rotated. Samples of the slurry were taken virtually simultaneously before it entered the pump and valve assembly and after. Each sample was analyzed electronically in accordance with the above cited reference to measure the reduction in particle size. This data is presented in Table 1.

TABLE 1.—EFFECT OF ONE PASS THROUGH PUMP AND VALVE ASSEMBLY

| A | B | C | D |
|---|---|---|---|
| Particle size of kaolin, microns | Percent by weight coarser than A in sample before pass | Percent by weight coarser than A in sample after pass | Difference |
| 25.1 | 2.5 | 1.1 | 1.4 |
| 19.9 | 4.9 | 3.7 | 1.2 |
| 15.8 | 11.7 | 8.0 | 3.7 |
| 12.6 | 20.8 | 16.4 | 4.4 |
| 10.1 | 31.6 | 25.9 | 5.7 |
| 8.1 | 43.5 | 38.2 | 5.3 |
| 6.6 | 54.5 | 49.2 | 5.3 |
| 5.52 | 63.9 | 57.3 | 6.6 |
| 5.07 | 66.9 | 61.1 | 5.8 |
| 4.26 | 72.8 | 67.5 | 5.3 |
| 3.8 | 76.0 | 71.2 | 4.8 |
| 3.2 | 80.1 | 76.7 | 3.4 |
| 2.54 | 85.6 | 83.2 | 2.4 |
| 2.01 | 89.6 | 86.9 | 2.7 |
| 1.63 | 91.7 | 90.1 | 1.6 |
| 1.33 | 94.1 | 93.1 | 1.0 |
| 1.09 | 96.2 | 95.4 | 0.8 |
| 0.97 | 97.0 | 96.7 | 0.3 |
| 0.87 | 98.0 | 97.8 | 0.2 |

One pass through the pump and valve assembly reduced the percent by weight of particles coarser than 2 microns from 89.6 to 86.9, a difference of 2.7. At the pumping rate, pressure and slurry concentration, the grinding equipment consumed 266 kilowatt-hours of electrical power per ton of minus 2 micron particles produced. The relatively low power consumption per ton of minus 2 micron material produced taken together with the instantaneous nature of the process constitutes an advantage over known methods of grinding kaolin.

*Example 2*

This example illustrates the effect of slurry concentration from 10% to 60% by weight on the efficiency of the method and apparatus of the present invention in generating new minus 2 micron kaolin. The kaolin used in this example was a Minnesota kaolin having particles 78.4% coarser than 1.9 microns as measured by the Coulter Counter. The pump and valve assembly employed was a Manton-Gaulin Laboratory Homogenizer having a pumping rate of 15 gallons per hours and having the construction shown in the drawings.

For each of the runs, exactly 2 liters of slurry were used. In preparing the slurry for each run an amount of the same kaolin was dispersed with the correct amount of water to obtain exactly a 2 liter quantity at the desired concentration. Each slurry sample was passed through the homogenizer 10 times at a pressure of 1500 p.s.i. All volumes, pumping times and manipulative procedures were made as identical as possible to make concentration the only variable between runs. The products of this treatment were analyzed electronically using the Coulter Counter, counting all particles coarser than 0.76 micron. The amount of minus 1.9 micron material produced compared to the starting feed was determined for each run. The results of this example are tabulated in Table 2 and plotted in FIGURE 5.

TABLE 2

| Concentration of kaolin by weight in feed, percent by weight | Grams of kaolin in 2 liters of slurry | Minus 1.9 micron material produced, grams |
|---|---|---|
| 10 | 213 | 24.3 |
| 25 | 591 | 20.1 |
| 30 | 733 | 35.9 |
| 40 | 1,060 | 67.9 |
| 50 | 1,430 | 74.4 |
| 60 | 1,900 | 72.2 |

Figure 5:
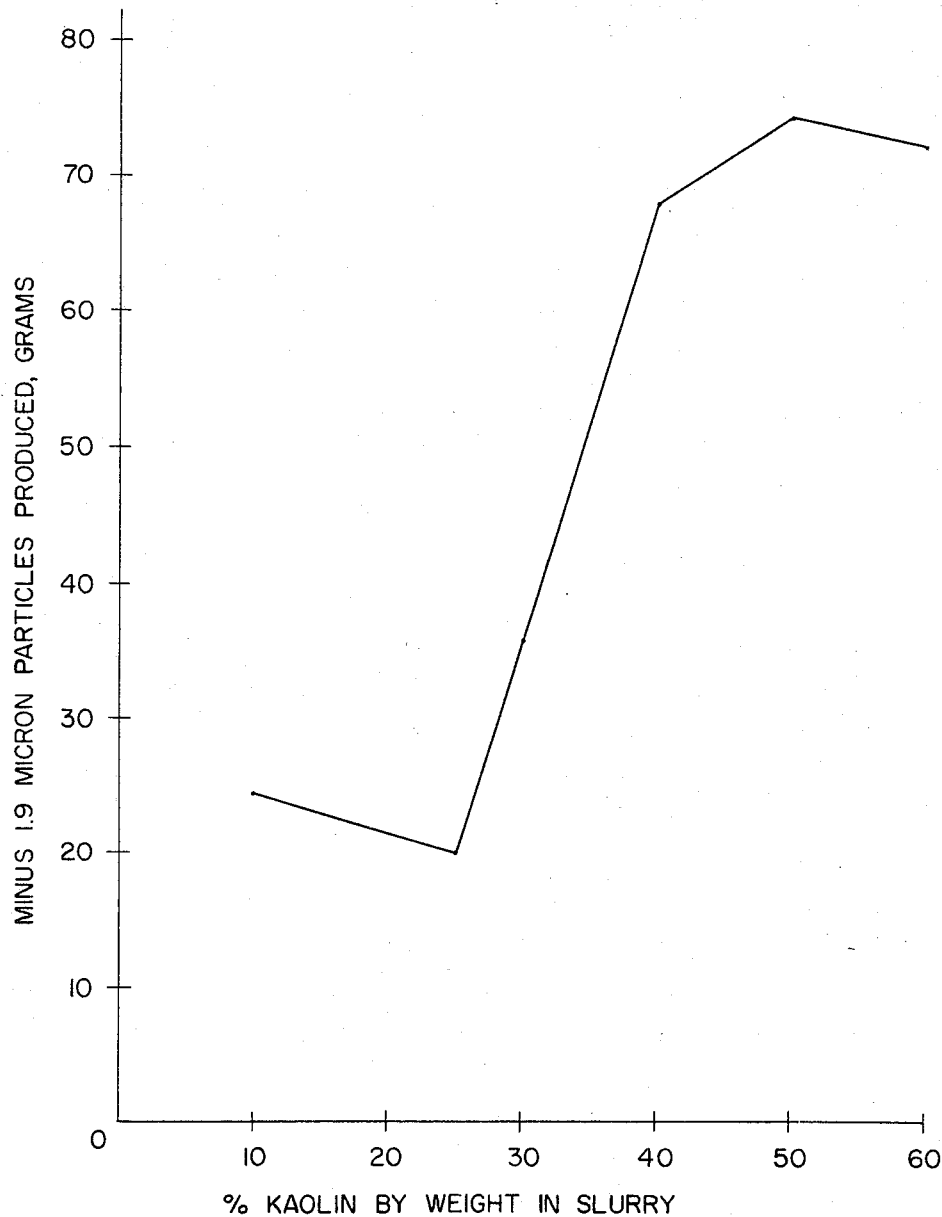
FIGURE 5 shows the effect of the slurry concentration of the feed on the amount of new minus 1.9 micron material (under 2 microns) produced by means of the method of this invention.

Inspection of Table 2 and FIGURE 5 indicates a rapid increase in new minus 1.9 micron material produced when the concentration of kaolin in the slurry fed to the pump and valve assembly 5 is increased above 25% to 30% and 40% and higher. The reason for this is believed to be that at the low concentrations the small particles (25 microns and less) pass through the valve opening without significant shearing effect (only the relatively large particles are reduced in size in significant amounts) whereas at the higher concentrations the increased number of particles causes them to rub and impact against each other during passage through the valve to reduce the particle size thereof, the greater the increase in concentration the greater this effect until a concentration of 50% is reached where the increase in yield of minus 2 micron particles appears to level off with further increases in concentration. The object of U.S. Patent No. 1,934,637 was to reduce only the oversize particles above 25 microns without significantly and simultaneously reducing the size of the smaller particles and thereby change the characteristics of the product. This is accomplished at concentrations lower than those of the present invention, as disclosed in that patent and confirmed by the above tables.

The grinding phenomena which occurs in the method of the present invention appears to be different from the rheology change phenomena achieved by the present invention in which the dilatancy point of clay slurries is increased substantially by passage through a homogenizing valve at increased concentrations. Evidence of this is that dilatancy continues to improve with increase in solids concentration beyond 50% whereas grinding efficiency levels off at this point. Apparently surface and other phenomena are involved in effecting rheology change whereas the grinding involves mainly particle size reduction.

*The rheology effect*

So far as increasing dilatancy of the clay is concerned, improved results are achieved by subjecting the slurry to a plurality of passes although some advantageous results are achieved with only one pass. The results improve as the number of passes is increased up to about ten passes. However, after about ten passes, the improvement achieved by further increasing the number of passes is not usually sufficient to warrant the added expense and at a certain point additional passes produce a negligible effect unless more dry clay is added to the processed clay to increase the clay concentration, in which case additional passes above 10 do produce improved results.

As aforesaid, the concentration at which the kaolin feed is passed through the homogenzing valve is important. If concentrations as low as 25% by weight are used, very little improvement in dilatancy point and viscosity occurs even after 10 passes. If the clay is processed at its maximum processable concentration without a deflocculating agent, i.e. 30% to 45% by weight solids concentration, some advantage is achieved. However, if the clay is processed with the deflocculating agent at a concentration near its dilatancy point (maximum processable concentration, usually 50 to 65% and higher, marked thinning or decrease in viscosity takes place and the dilatancy point is markedly increased. Moreover, if between passes additional dry clay is added to the clay slurry and the resulting more concentrated slurry is subjected to an additional one or more passes through the same or different homogenizing valves at a concentration of between 65% and 70% and higher, the dilatancy point and fluidity of the slurry can be even more markedly improved. The reason why more dry clay can be added between passes is that passage through the homogenzing valve or valves preceding such addition reduces viscosity so that more clay can be added to bring the viscosity back up to the maximum which can be handled by the pump and homogenizing valve. The resulting increase in concentration by the addition of more clay causes a greater increase in dilatancy point to occur during the subsequent passes as compared to subjecting the slurry to the subsequent passes without the addition of more clay. Also, the subsequent passes reduce the viscosity of the more concentrated slurry. The additional clay cannot be added to the initial feed because at the increased concentration the slurry is too viscous to be handled by the pump and homogenizing valve. It is not understood by the addition of such clay between passes or the increased clay concentration produced thereby provides those improved results. From the above it is clear that the greater the clay concentration of the slurry feed the better the results, which is most surprising. However, the concentration cannot be increased to the point where the slurry is too viscous for flow through the pump and homogenizing valve.

As stated earlier, the processing of clay slurries in accordance with this invention both for grinding and for increasing the dilatancy point of the clay is done in the presence of one or more clay dispersing or deflocculating agents such as are well known to those practiced in clay technology. These agents include tetrasodium pyrophosphate, sodium hexametaphosphate and other soluble alkali metal salts of a phosphate, sodium silicate, soda ash, ammonium hydroxide and other alkalis such as sodium and potassium hydroxides, etc., alone or in combination. These clay deflocculating chemicals in general enable the attainment of higher concentrations of clay at lower viscosities and are used widely in preparing concentrated slurries for shipment as such.

The concentrations of these deflocculating agents used in carrying out the method of the present invention range from about 0.05% to about 1.0%, preferably about 0.1% to 0.5%, by weight based on the weight of dry clay present. The amount which should be used depends in each instance upon the particular clay feed and can be determined by routine experiment as that amount which gives a minimum viscosity for any particular clay feed.

In the preferred manner of practicing this invention, the clay is pumped through the homogenizing valve in a deflocculated state so that maximum concentrations of clay can be employed. It is at these high concentrations, 50 to 65% and higher, that the increase in dilatancy and decrease in viscosity are most pronounced. Also grinding efficiency is increased. Thus, the use of deflocculating agents by reducing the viscosity of the slurry feed to thereby permit higher clay concentration in the feed which can be handled by the pump and homogenizing valve, increase the beneficial effect of the homogenizing valve to provide a greater increase in dilatancy and a greater decrease in viscosity and a greater amount of grinding to minus 2 micron particle size. However, the deflocculating agent itself causes some decrease in viscosity of the final clay product. It is not certain that the deflocculating agent enhances the action of the homogenizing valve solely on account of permitting higher clay concentrations of the feed.

In one embodiment of this invention, water is added to tank 1, together with deflocculating chemicals. Sufficient dry clay is then added to form a slurry having as high a percentage of solids as can be attained while still retaining pumpability. It is important to achieve optimum results that the clay concentration in the slurry be sufficiently high, of the order of 50–65% or higher, so as to insure intense rubbing and mechanical working of the clay particles. When treating clays that initially have a very low dilatancy point and thus are exceedingly thick and viscous, the tank 1 and agitator 2 pictured in FIG. 1 may be replaced by a pug mill, sigma blade mixer, or other more powerful mixer.

The exact phenomena which occur during passage through the homogenizing valve and which impart to the clay the properties of a higher dilatancy point and a lower viscosity at high concentrations are not understood. Nor is it understood what physical changes occur in the clay to impart to it these properties. However, it is certain that physical changes do take place as evidenced by the changes in properties. The processed clay having such changed properties is believed to be a new kind of clay and the water-clay compositions and paper coating compositions which contain such clay are new compositions of matter.

The effect of clay concentration on the dilatancy point of the clay in the method of the present invention is shown in the following Example 3.

*Example 3*

The kaolin used in this example was a Minnesota kaolin having a dilatancy point with a deflocculating agent (tetrasodium pyrophosphate) present, of 66%. The homogenizer employed was a Manton-Gaulin Laboratory Homogenizer having a pumping rate of 15 gallons per hour and having the construction shown in the drawings.

In Run 1, 500 grams of dry clay, 2 grams of tetrasodium pyrophosphate (0.4 by weight based on dry clay), and 2000 grams of water were mixed in the feed tank 1 of the homogenizer in order to produce a uniform slurry of 25% kaolin by weight. The slurry was then given 10 passes through the pump and homogenizer assembly 5 at 1500 p.s.i. The slurry was dewatered by evaporation and the dilatancy point determined as set forth above. The viscosity of the clay was measured in centipoises (cps.) at 64% solids by weight using a Brookfield viscosimeter at 10 r.p.m. and 100 r.p.m.

In Run 2, another quantity of the same kaolin was adjusted to 64% kaolin solids and 0.4% by weight of tetrasodium pyrophosphate. This slurry was given 10 passes through the homogenizer under the same conditions as Run 1; then the viscosity of the processed clay slurry was measured at 10 r.p.m. and 100 r.p.m. in the same manner as Run 1. A quantity of the slurry was evaporated to dryness in the same manner as Run 1 and the dilatancy point determined in the same manner as Run 1.

In Run 3, additional kaolin feed was added to processed slurry from Run 2 until a slurry containing 70% kaolin solids by weight was obtained. This slurry was pumpable through the pump and homogenizing valve assembly since the concentration thereof was well below the new dilatancy point of the kaolin and it was given five more passes through the pump and homogenizing valve assembly at 1500 p.s.i. The initial kaolin concentration in the feed in Run 2 could not be made this high, i.e., 70%, because this concentration is above the dilatancy point of the kaolin in such feed. The slurry, after the aforementioned five passes, was evaporated to dryness and the dilatancy point and viscosity at 70% solids by weight determined.

The data obtained from these runs is listed in Table 3.

TABLE 3

| | Run 1 | Run 2 | Run 3 |
|---|---|---|---|
| Concentration of kaolin slurry during processing, percent | 25 | 64 | 70 |
| Dilatancy point in percent by weight of processed clay | 66 | 71.3 | 73.0 |
| Brookfield viscosity, cps. at 64% solids: | | | |
| 10 r.p.m. | 1,400 | 875 | (¹) |
| 100 r.p.m. | 770 | 240 | (¹) |
| Brookfield viscosity, cps. at 70% solids: | | | |
| 10 r.p.m. | (²) | 7,360 | 520 |
| 100 r.p.m. | (²) | 2,100 | 280 |

¹ Not measured.
² Above dilatancy point so that viscosity could not be measured.

As indicated above, the initial kaolin feed became dilatant at 66% kaolin solids by weight, or at a ratio of 2 parts clay to 1 part water. Through the use of the present invention, the dilatancy point was increased to 73% solids by weight, or a ratio of 2.8 parts clay to 1 part water. Thus 40% more clay can be incorporated with a given amount of water before reaching dilatancy. Moreover, after processing the clay in accordance with the present invention, it is very fluid and has a low viscosity at 70% solids whereas a 70% solids concentration of the original feed is not flowable and hence cannot be pumped, as such, or used in a higher solids paper coating composition. The higher viscosity at 10 r.p.m. (lower shear rate) (this is considered as a near quiescent condition) as compared with the lower viscosity at 100 r.p.m. (higher shear rate) indicates thixotropy. Thus, the processed clay at 70% solids is thixotropic and has a low viscosity, whereas the unprocessed clay is dilatant at 66% solids. It is noted that the processed clay from Run 3 at 70% solids has a viscosity comparable to processed clay from Run 2 at 64% solids.

The dilatancy point of a clay is important in that it is an index of the viscosities of aqueous slurries of the clay at all concentrations, i.e., the higher the dilatancy point, the more fluid the clay-water system is at all concentrations as compared to a clay having a lower dilatancy point.

Generally, in order to be competitive for use in coating compositions for paper coating, the clay must have a dilatancy point above, and be readily fluid (have a low viscosity) at, a 70% solids concentration. Therefore, Minnesota clays and many other clays from other deposits, which have a dilatancy point substantially below 70%, are not competitive for use in paper coating compositions with the best grade of commercially produced clays, such as Georgia clays, which have dilatancy points of, and are fluid at, 70% solids concentration and higher. Treatment in accordance with the present invention makes these clays competitive.

Accordingly, the greatest advantages achievable by the present invention are with those clays having a dilatancy point below 70%. However, treatment in accordance with the present invention even of those clays, which have a dilatancy point well above, and are readily fluid at, 70% solids concentration and which are presently being used in paper coating compositions, such as Georgia kaolins, provides advantageous effects, to wit, it renders them even more fluid at even higher concentrations and increases their dilatancy points.

Thus, the use of this invention permits the utilization of kaolin for paper coating compositions from deposits which heretofore could not be commercially exploited because of poor rheological properties, e.g. Minnesota clay. Furthermore, the utility of existing commercial grades of clay can be enhanced by improving already acceptable rheological properties. For example, English clay has always been preferred for its brightness and color compared to domestic clays mined in Georgia. However, the fact that English coating grades exhibit higher viscosity at lower solids concentrations and have lower dilatancy points than do Georgia kaolins has limited wide usage of the former in favor of increased consumption of the latter. English clays become dilatant at 67% solids. Using the method of the present invention, the concentration at which English kaolin clays can be conveniently used can be increased substantially by increasing their dilatancy points.

The kaolin feed in Example 3 is generally not considered competitive for use in paper coating compositions. However, paper coating compositions prepared from such feed after treatment in accordance with Run 3 of Example 1 and containing 50 to 60%, e.g. 55%, by weight total solids in water, the solids consisting of four parts of the kaolin product of Run 3 to one part binder, e.g., starch (the clay-binder ratio may vary), have been found to be highly satisfactory for coating paper.

We claim:
1. A method of decreasing the particle size of kaolin particles, including particles 25 microns and finer, comprising forcing a liquid slurry of said kaolin particles, having a kaolin concentration not substantially less than 30% by weight, in the form of a thin film edgewise through a thin hard-surfaced gap under a high pressure and at an extremely high velocity by virtue of reduction of said high pressure to a substantially lower pressure.

2. A method according to claim 1, said high pressure forcing said gap to open to provide said flow of slurry therethrough against a yieldable force tending to close said gap.

3. A method according to claim 1, said concentration of kaolin in said slurry being at least about 40% by weight.

4. A method according to claim 1, said film moving through said gap in a direction at an angle to the direction of flow to the gap, said high pressure being at least 100 pounds per square inch.

5. A method accorring to claim 1, also including directing the discharge from said gap against a hard impact surface.

6. A method according to claim 5, said high pressure forcing said gap to open to provide said flow of slurry therethrough against a yieldable force tending to close said gap.

7. A method according to claim 5, said concentration of kaolin in said slurry being at least 40% by weight.

8. A method according to claim 5, said film moving through said gap in a direction at an angle to the direction of flow to the gap, said high pressure being at least 100 pounds per square inch.

9. A method of claim 1, said film having a maximum thickness of about 0.09 inch and moving through said gap.

10. A method of increasing the dilatancy point of clay comprising forcing a flowable liquid slurry of said clay, having a clay concentration not substantially less than 30% by weight, in the form of a thin film edgewise through a thin hard-surfaced gap under a high pressure of at least 100 lbs. per square inch and at an extremely high velocity by virtue of reduction of said high pressure to a substantially lower pressure.

11. A method according to claim 10, said slurry containing a deflocculating agent.

12. A method according to claim 11, said high pressure forcing said gap to open to provide said flow of slurry therethrough against a yieldable force tending to close said gap.

13. A method according to claim 11, said concentration of clay in said slurry being at least about 50% by weight.

14. A method according to claim 11, said deflocculating agent comprising an alkali metal salt of a polyphosphate.

15. A method according to claim 11, said film having a maximum thickness of about 0.09 inch and moving through said gap in a direction at an angle to the direction of flow to the gap.

16. A method according to claim 11, also including directing the discharge from said gap against a hard impact surface.

17. A method of increasing the dilatancy point of clay comprising forcing a flowable liquid slurry of said clay in the form of a thin film edgewise through a thin hard-surfaced gap and at an extremely high velocity by virtue of reduction of said high pressure to a substantially lower pressure, said method including subjecting said clay slurry to a plurality of passes through said gap and adding more clay to said slurry between passes to increase the clay concentration.

18. A method according to claim 15, said slurry containing a deflocculating agent and having a clay concentration not substantially less than 60% by weight after said addition of said more clay.

19. A method according to claim 15, said slurry containing a deflocculating agent and having a clay concentration not substantially less than 30% by weight before said addition of said more clay.

20. A method according to claim 15, also including directing the discharge from said gap against a hard impact surface.

References Cited

UNITED STATES PATENTS

| | | | |
|---|---|---|---|
| 3,253,791 | 5/1966 | Cohn | 241—5 |
| 3,266,917 | 8/1966 | Sawyer | 106—288 X |
| 3,274,011 | 8/1966 | Duke | 106—288 X |
| 3,282,715 | 11/1966 | Sawyer | 106—72 |

WILLIAM W. DYER, Jr., *Primary Examiner.*

R. J. ZLOTNIK, *Assistant Examiner.*

UNITED STATES PATENT OFFICE
CERTIFICATE OF CORRECTION

Patent No. 3,348,778                                          October 24, 1967

Morris I. Cohn et al.

It is hereby certified that error appears in the above numbered patent requiring correction and that the said Letters Patent should read as corrected below.

Column 1, line 16, before "substantially" insert -- not --.

Signed and sealed this 12th day of November 1968.

(SEAL)
Attest:

Edward M. Fletcher, Jr.
Attesting Officer

EDWARD J. BRENNER
Commissioner of Patents